Sept. 30, 1969  D. W. MORRIS  3,469,342
CHRISTMAS TREE STAND
Filed May 22, 1967
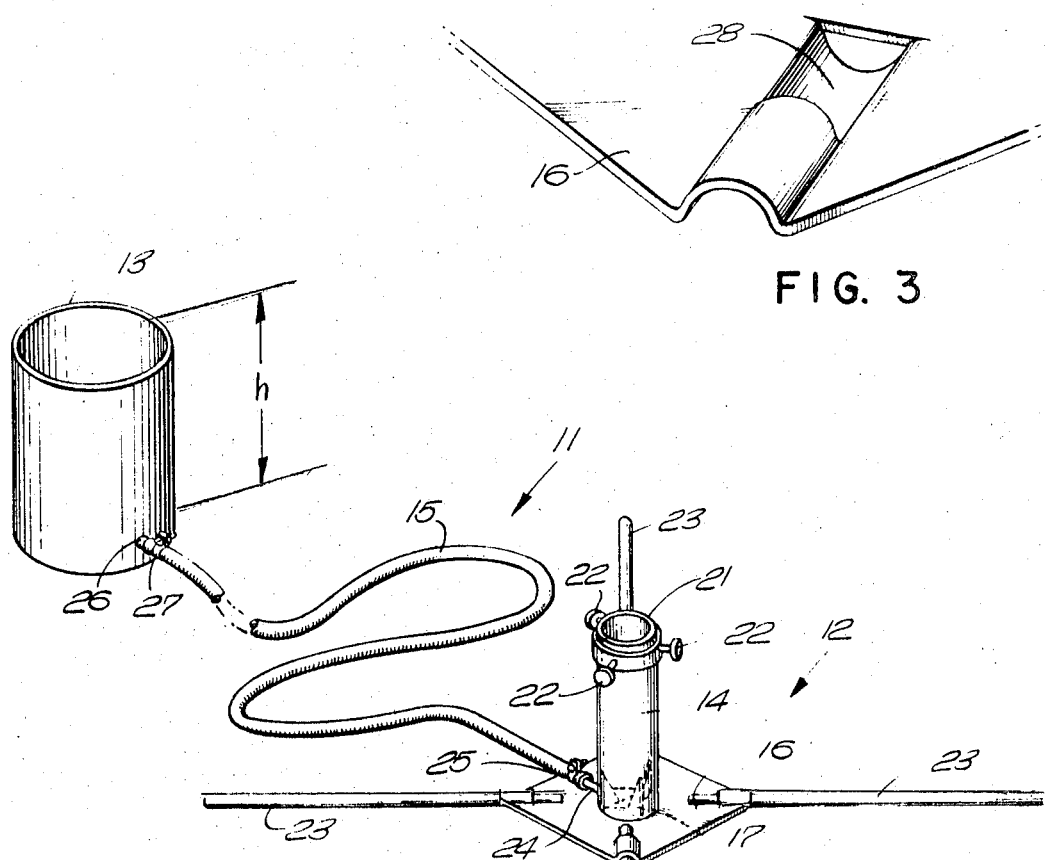
FIG. 3
FIG. 1
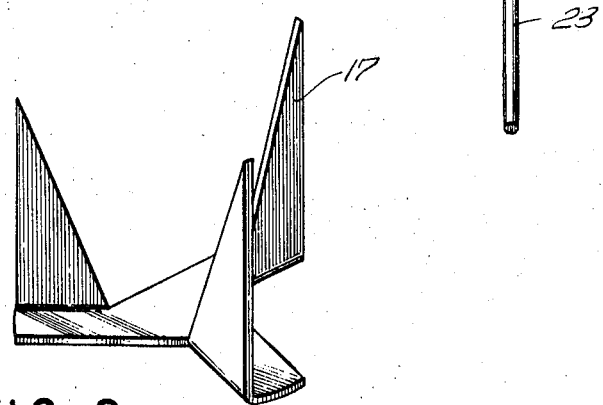
FIG. 2
INVENTOR.
DREW W. MORRIS
BY
Weingarten, Ovenbuch & Lalire
ATTORNEYS

United States Patent Office 3,469,342
Patented Sept. 30, 1969

3,469,342
CHRISTMAS TREE STAND
Drew W. Morris, 5 Plymouth River Road,
Hingham, Mass. 02043
Filed May 22, 1967, Ser. No. 640,080
Int. Cl. A01g 27/00
U.S. Cl. 47—38      3 Claims

ABSTRACT OF THE DISCLOSURE

A stable Christmas tree stand having a nonporous tree support cylinder which is connected by a flexible hose to a remote water reservoir. The reservoir is easily refilled with water so that the tree trunk is continuously immersed in water in the cylinder, thereby preserving the freshness of the tree and reducing the fire hazard.

FIELD OF THE INVENTION

This invention relates in general to Christmas tree stands and more particularly concerns a novel device for supporting a cut tree and for substantially prolonging the useful life of the supported tree.

DESCRIPTION OF THE PRIOR ART

The devices available for supporting Christmas trees indoors are many and varied. Two crossed pieces of wood were suitable for a long time. With the advent of metal Christmas tree stands came the means for keeping the butt of the tree damp, hopefully maintaining the tree's freshness over a long period of time and decreasing the fire hazard. However, most of these stands are designed to hold a very limited supply of water with a consequence that refills are frequently necessary. Since most natural trees used for indoor purposes have relatively sharp needles, pouring water into the stand at the base of the tree is decidedly awkward and tends to become a chore which is easily neglected. The normal result is that the tree quickly dries out and it begins to shed its needles creating a fire hazard. Another problem with many contemporary stands is that they are unstable when in use so that the tree is easily upset with consequent damage to the tree and decorations and possible spillage of water from the stand itself.

SUMMARY OF THE INVENTION

The present invention is designed to overcome the foregoing objections by providing a tree stand which maintains the tree in a stable vertical position with its trunk continuously surrounded with water to maintain its freshness. Broadly speaking, the invention comprises a watertight cylindrical container having means for centering the butt of the tree at the bottom end of the cylinder and means at the top for securing the cylinder to the tree trunk. The bottom end is mounted on a flat base plate with removable horizontally extending arms to provide stability. The cylinder has a short spout near the bottom communicating with its interior. A water container is situated at a remote location, it too having a spout near its base. The interior chambers of the cylinder and the water container are interconnected by a flexible tube attached to both spouts. The tree support cylinder is so designed that it is fully watertight to a height above the top of the water container, so that even when the water container is completely full, water will not leak out of the cylinder.

A feature of this device is that it solves the problem of refilling the tree stand with water, since the remote container is readily accessible for refilling and is large enough so that frequent refilling is unnecessary.

Another feature is that the horizontally extending arms greatly enhance overall stability so that the tree is not easily upset.

The invention, both as to its arrangement and its manner of operation, can be more readily understood from the following detailed exposition when considered in conjunction with the accompanying drawings.

BRIEF DESCRIPTION OF THE DRAWING

FIG. 1 is a perspective view of the preferred embodiment of the tree stand of this invention;

FIG. 2 is a perspective view of the centering jig used in the stand of FIG. 1; and FIG. 3 is a perspective of the detail of a corner of the base plate shown in FIG. 1.

DESCRIPTION OF THE PREFERRED EMBODIMENTS

With reference now to the drawing, FIG. 1 shows a Christmas tree stand indicated generally by reference numeral 11, comprising support unit 12 and reservoir 13. Support unit 12 has a watertight cylinder 14 for holding a tree in upright position and maintaining its trunk immersed in water. Reservoir 13 is remotely located from support 12, its interior and the interior of cylinder 14 being interconnected for fluid communication by means of flexible tube 15.

Support unit 12 comprises an open-ended cylinder 14 mounted on base plate 16 by a suitable method, such as welding, brazing or soldering, to form a watertight seal between the two elements. It is thus contemplated that both cylinder 14 and the base plate 16 be made of metal, although the particular materials used are of no importance to the inventive concept disclosed herein. To facilitate the proper alignment of cylinder 14 at the approximate center of base plate 16 and to provide a method of holding the two elements together without relative motion during the mounting step, centering jig 17 is first mounted at the approximate center of base plate 16. Center jig 17, as shown more clearly in FIG. 2, is a piece of relatively heavy gauge sheet metal (in the order of 1/16 inch thick) formed to provide three wedge-shaped prongs in equiangular relationship from each other and sloping toward the center of the jig. The interior of cylinder 14 is of such size as to fit closely around jig 17. Although the jig and cylinder 14 may be made in various sizes, the size of the jig would normally be that which will fit a cylinder large enough to hold the trunk of most household Christmas trees.

Near the upper end of cylinder 14 three holes are radially bored through the cylinder walls, all in a single plane perpendicular to the axis of cylinder 14, spaced equiangularly from each other. A collar 21, also having three equiangularly spaced and tapped holes, is mounted around the top of cylinder 14, with the collar holes in registration with the cylinder holes. Clamping bolts 22 are threaded through the holes in collar 21 and extend into the interior of cylinder 14. Bolts 22 may be pointed if desired so that they firmly engage the trunk of the tree inside cylinder 14. Attached near the base of cylinder 14 is spout 24 to which one end of tube 15 is secured by means of clamp 25.

In order to greatly enhance stability, four horizontal arms 23 are inserted into the four corners of base plate 16. The corners of base plate 16 are formed as indicated in FIG. 3. Arms 23 may be made of any suitable substantially rigid material such as wood or metal. It can be seen that the portions 28 of the corners of base plate 16 which extend below the plane of the base plate act as shallow feet to raise the remainder of the base plate off the floor. This feature enables the support to remain stable even if base plate 16 should tend to spring or warp downward at its center.

Reservoir 13 may be made of any suitable non-porous material such as metal, plastic or glass, and is fitted with spout 26 near its base. It is of sufficient size to hold substantially more water than cylinder 14. The other end of tube 15 is secured to spout 26 by means of clamp 27. As finally assembled, tree stand 11 has two stable upright fluid containers whose interiors are in communication with each other so that the water levels in both containers are the same.

The height of reservoir 13 is governed by the height of the holes in cylinder 14 from a common supporting surface, generally the floor, when the stand is in use. That is, since cylinder 14 is watertight only up to the level of the holes through which bolts 22 pass, the stand must be so designed that reservoir 13 cannot be filled to a level higher than those holes. This would mean that with reservoir 13 and support unit 12 resting upon a common surface, the top of reservoir 13 must be below the level of the holes near the top of cylinder 14.

To use tree stand 11, one simply places the trunk of a tree in cylinder 14, the butt of the tree being automatically centered and held steady by centering jig 17. Bolts 22 are then screwed toward the center of the tree trunk. When the tree is fully secured and adjusted to be properly vertical, reservoir 13 is placed in some out-of-the-way place on the same supporting surface as support 12, and is filled with water. Since tube 15 may be any desired length, the placement of reservoir 13 is widely variable to suit the convenience of the user. Due to the communication between the interiors of the two containers, the trunk of the mounted tree is then surrounded by water to a level equal to the water level in reservoir 13. This dampness prolongs the freshness of the tree and delays drying out and shedding of needles. In this way it is a simple matter to maintain a cut tree natural looking for extended periods of time. Maintaining the water level surrounding the tree trunk presents no problems with this tree stand.

If it is desired, for instance, if there are small children around the house, reservoir 13 may be provided with a watertight cover so that no damage would be done if it were accidentally upset. The shape of the reservoir is irrelevant, as is its material. The only requirements are that its maximum water level be governed by the height of the holes in cylinder 14; that it readily indicate the level of the water therein; and that it be easily refillable.

With the basic preferred embodiment now described, many modifications will become obvious to those skilled in this art. For example, cylinder 14 may initially have a watertight base (instead of being open-ended) with centering jig 17 mounted therein as one integral unit which is then mounted to base plate 16. The support unit may have various size cylinders to fit various size trees. The holes in the top of the cylinder need not be limited to three, and any number may be used. Furthermore, if cylinder 14 is of sufficient thickness and rigidity, the holes therethrough may themselves be threaded, thus obviating the need for collar 21. An alternate method of providing threaded holes would be to attach nuts to the side of cylinder 14 in registration with each hole therethrough. Although it is assumed that collar 21, if used, would be attached to the side of cylinder 14 by brazing, welding or soldering, or by other appropriate means, it need not be attached at all, since its intended functions may be realized merely by screwing bolts 22 far enough to engage and pass partly through the registering holes in cylinder 14.

Thus the invention should be construed as limited only by the spirit and scope of the appended claims.

What is claimed is:
1. A tree stand comprising:
a vertical substantially watertight tree support cylinder having a spout near its base;
a flat base, the buttom of said cylinder being rigidly attached thereto;
means at the bottom of said cylinder for centering and maintaining the position of the butt of a tree when the tree trunk is inserted therein;
a substantially watertight reservoir having a spout near its base; and
a flexible tube connecting said cylinder spout with said reservoir spout;
the height of said reservoir being equal to or less than the height of said support cylinder;
whereby when said reservoir is mounted on substantially the same level as said cylinder and said reservoir is filled with a liquid, the liquid is freely communicated to said cylinder, the level of the water always being at or below the top of said cylinder.

2. A tree stand according to claim 1, wherein:
said centering means comprises a plurality of wedges equiangularly spaced within the bottom of said cylinder and fastened to said flat base and sloping from the side of said cylinder toward the axis thereof, said wedges fitting snugly within said cylinder.

3. A tree stand according to claim 2, further comprising:
a removably mounted arm extending horizontally from each corner of said flat base, said arms providing enhanced stability for said tree stand.

References Cited
UNITED STATES PATENTS

| | | | |
|---|---|---|---|
| 2,421,140 | 5/1947 | Blaner | 248—44 |
| 2,891,747 | 6/1959 | Steede | 248—44 |
| 2,938,304 | 5/1960 | Thomas et al. | 47—57.5 |
| 2,994,498 | 8/1961 | Sager | 248—44 |
| 3,227,405 | 1/1966 | Layton | 248—44 |

ROBERT E. BAGWILL, Primary Examiner

U.S. Cl. X.R.

248—44